United States Patent
Hobohm

(10) Patent No.: US 8,708,618 B2
(45) Date of Patent: Apr. 29, 2014

(54) REAMER

(75) Inventor: Uwe Hobohm, Wendelstein (DE)

(73) Assignee: Kennametal Inc., Latrobe, PA (US)

( * ) Notice: Subject to any disclaimer, the term of this patent is extended or adjusted under 35 U.S.C. 154(b) by 572 days.

(21) Appl. No.: 12/991,997

(22) PCT Filed: May 19, 2009

(86) PCT No.: PCT/EP2009/003532
§ 371 (c)(1),
(2), (4) Date: Jan. 25, 2011

(87) PCT Pub. No.: WO2009/143973
PCT Pub. Date: Dec. 3, 2009

(65) Prior Publication Data
US 2011/0135413 A1 Jun. 9, 2011

(30) Foreign Application Priority Data
May 30, 2008 (DE) .......................... 10 2008 025 962

(51) Int. Cl.
*B23D 77/02* (2006.01)

(52) U.S. Cl.
USPC ............. 408/1 R; 408/201; 408/225; 408/227

(58) Field of Classification Search
USPC ......... 408/144, 145, 200, 201, 227, 229, 230, 408/1 R
IPC ............................................ B23D 77/00,77/02
See application file for complete search history.

(56) References Cited

U.S. PATENT DOCUMENTS

| | | | |
|---|---|---|---|
| 595,346 A | 12/1897 | Saacke | |
| 3,824,027 A * | 7/1974 | Janci .............................. | 408/230 |
| 4,231,693 A | 11/1980 | Kammeraad | |
| 4,728,231 A * | 3/1988 | Kunimori et al. ............... | 408/59 |
| 5,429,504 A * | 7/1995 | Peltier et al. ................... | 433/165 |
| 5,827,018 A | 10/1998 | Blankenship et al. | |
| 6,022,175 A * | 2/2000 | Heinrich et al. .............. | 407/119 |
| 6,379,090 B1 | 4/2002 | Halley et al. | |
| 2003/0175086 A1 * | 9/2003 | Muhlfriedel et al. ......... | 408/230 |

FOREIGN PATENT DOCUMENTS

| | | | |
|---|---|---|---|
| CH | 364163 | 8/1962 | |
| DE | 374340 C | 4/1923 | |
| DE | 560567 | 10/1932 | |
| DE | 921125 | 12/1954 | |
| DE | 20209767 U1 * | 11/2003 | ............ B23B 51/06 |
| DE | 202005020829 U1 * | 12/2006 | ............ B23B 51/02 |
| EP | 0 121 634 B | 10/1984 | |

(Continued)

OTHER PUBLICATIONS

EPO English Machine Translation—Roxer, S.A., "Outil Pour Creuser des Logements de Têtes de Vis," Aug. 31, 1962.*

(Continued)

*Primary Examiner* — Daniel Howell
*Assistant Examiner* — Michael Vitale
(74) *Attorney, Agent, or Firm* — Larry R. Meenan, Esq.

(57) ABSTRACT

A reamer for the precision machining of a drilled hole, having a plurality of cutting bars which are separated from one another by chip grooves and extend in the longitudinal direction of the tool, wherein a plurality of chip divider grooves which run in the transverse direction of the tool and divide each cutting bar into cutting segments are provided.

13 Claims, 4 Drawing Sheets

(56) References Cited

FOREIGN PATENT DOCUMENTS

| EP | 0195838 B1 | | 12/1989 | |
|---|---|---|---|---|
| EP | 0937528 B1 | | 5/2001 | |
| EP | 1317985 A1 | | 6/2003 | |
| GB | 104855 | | 3/1917 | |
| GB | 287327 A | * | 3/1928 | ............... B23G 5/06 |
| JP | 58 137521 A | | 8/1983 | |
| JP | 64002815 A | * | 1/1989 | ............. B23D 77/00 |
| SU | 671940 A | * | 7/1979 | ............. B23B 51/06 |

OTHER PUBLICATIONS

The International Bureau of WIPO, "International Preliminary Report on Patentability" and "Written Opinion of the International Searching Authority", International Application No. PCT/EP20091001278, Issued Dec. 6, 2010, 8 pp.

* cited by examiner

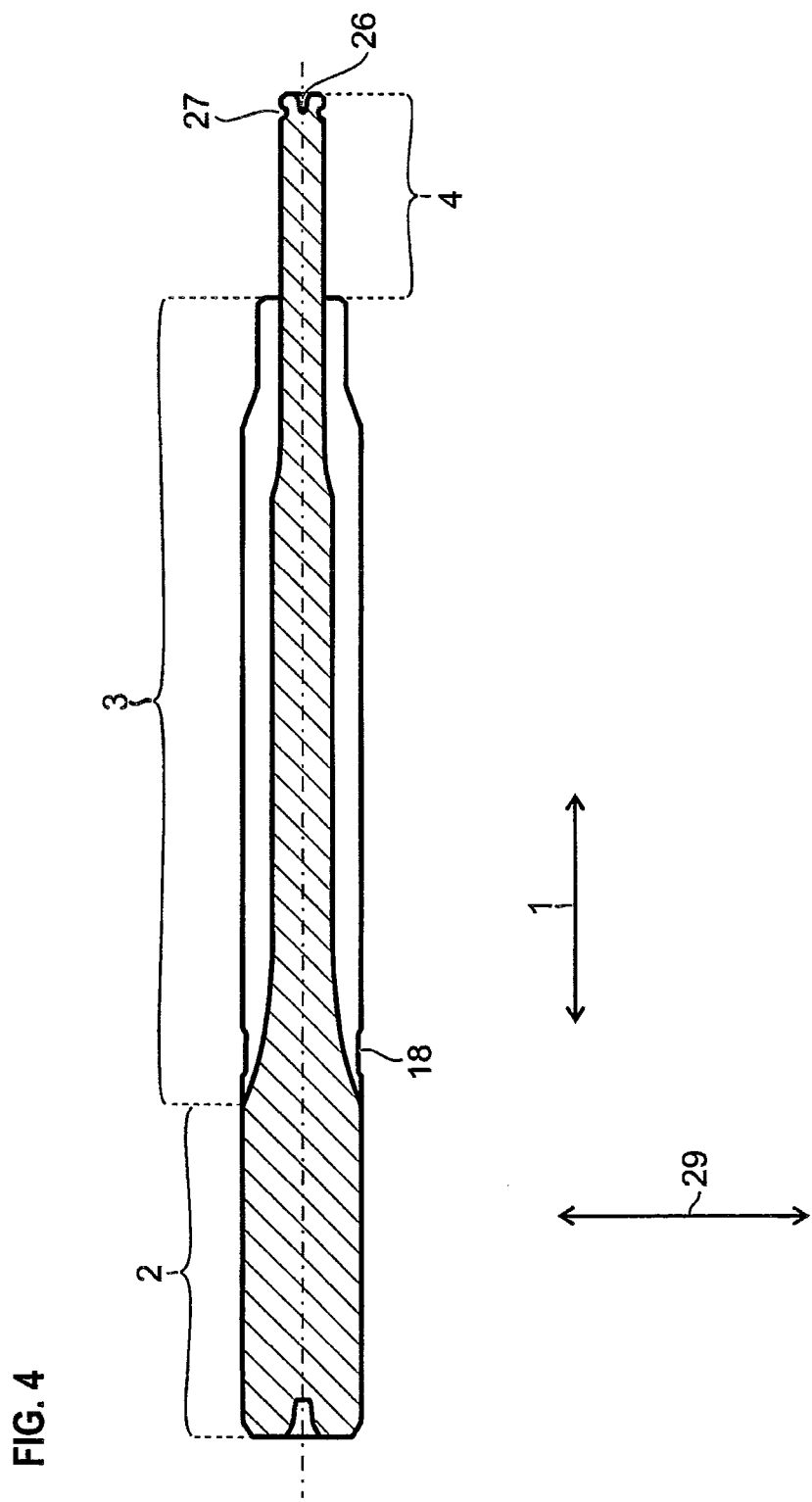

REAMER

BACKGROUND OF THE INVENTION

The invention relates to a reamer for the fine machining of a bore. The reamer according to the invention is used for the fine machining of bores having varying bore cross-sections. In particular, the reamer is suitable for the machining of cartridge chambers of firearms. Such cartridge chambers are produced from the solid. The cartridge chamber precedes the weapon barrel, and has a stepped drilled hole having a front portion having a smaller region that matches the shape of the tip of the cartridge and, adjoining said region, a cylindrical region of greater diameter. According to the prior art, the drilled holes drilled from the solid are fine machined by means of reamers. According to the prior art, this machining takes approximately 3 minutes per cartridge chamber.

Preceding therefrom, the invention is based on the object of reducing the machining time.

SUMMARY OF THE INVENTION

Used to reduce the working time are, firstly, a reamer that is used, in particular, for roughing, the fine machining method according to the invention and, finally, the tool set according to the invention, which comprises two tools. A significant reduction in the throughput times is associated with the invention.

The core of the invention consists in a reamer for fine machining, in particular for roughing of the bore.

This reamer has a plurality of cutting strips, which extend in the longitudinal direction of the tool and which each carry a cutting edge. The individual cutting strips are separated from one another by chip grooves. These chip grooves likewise extend in the longitudinal direction of the tool. The reamer according to the invention has, on each cutting strip, a plurality of chip divider grooves that extend in the transverse direction of the tool. Each two chip divider grooves constitute between them a cutting-edge segment. By means of the chip divider grooves, the individual cutting strips are thus divided into a plurality of cutting-edge segments. During cutting by means of the tool, the chip divider grooves act as chip breakers. The cutting machining by means of the cutting-edge segments and the chip divider grooves provided between the cutting-edge segments results in the production of short chips. Because of these short-breaking chips, the cutting speed of the reamer can be increased significantly and the removal of chips greatly assisted.

The reamer body is divided into a plurality of regions. Thus, in an advantageous development, there is provided a reamer basic body having the chip grooves and the cutting strips, and a guide end that precedes the reamer basic body. A guide sleeve is rotatably mounted on the guide end. The guide sleeve guides and centers the reamer in the drilled hole, and also provides for the centering of the reamer during the chip-removing process at high cutting speeds.

It is furthermore advantageous for the chip grooves to be helical in form, and for correspondingly helical cutting strips to be located between the cutting grooves. In a further development, it is advantageous for the chip divider grooves to be provided at respectively constant distances from one another.

Owing to the uniform distance between the individual chip divider grooves, there are produced cutting-edge segments that each have cutting edges of equal length.

To match the geometry of the drilled hole, the reamer basic body has two or more basic-body regions having differing outer diameters. The reamer basic body is thus matched, in its outer geometry, to the inner geometry of the bore to be machined.

To stabilize the cutting edges, each cutting edge is succeeded by a cutting-edge bevel. In a first basic-body region of lesser diameter, the cutting bevel is smaller than that preceding the individual cutting edges of the individual cutting-edge segments in the second basic-body region of a greater outer diameter. In a preferred embodiment of the invention, the cutting-edge bevel width in the first, thinner basic-body region of lesser outer diameter is 0.1 mm, while the cutting-edge bevel width in the second, thicker basic-body region of greater outer diameter is 0.2 mm.

In a further advantageous development, the distance between each of the mutually adjacent chip divider grooves in the longitudinal direction of the tool is less than 10% of the total length of the cutting-edge regions of the reamer basic body that are constituted by the cutting strips. Thus, in an exemplary embodiment, the cutting-edge region of the reamer basic body is approximately 80 mm long. In the case of this exemplary embodiment, the chip divider grooves are spaced approximately 6 mm apart from one another.

To further increase the cutting speed, the chip divider grooves of the individual cutting strips are preferably offset in relation to one another in the longitudinal direction of the tool. In this way, the cutting edges of the individual cutting-edge segments are arranged so as to overlap one another.

To improve the concentricity characteristics of the reamer, four cutting strips are provided, arranged with an unequal pitch in relation to one another.

Preferably, hard metals are used as a material for the reamer. Thus, solid hard metals, such as cermet or similar, are suitable as a material. However, the use of a hardened steel, or high-speed steel, is also equally conceivable and advantageous as a material. Finally, ceramic is also suitable as a material for the reamer. The same also applies to cubic boron nitride, referred to by the abbreviation CBN.

For the embodiments with all of the aforementioned materials, it is possible both to use the materials uncoated and to provide a coating. In particular, it is advantageous to coat the reamer with a soft slip agent.

In a further development, a thin coating of the reamer is provided in addition. This thin coating advantageously has a layer thickness in the range between 0.5 and 0.8 µm. A PVD (physical vapor deposition) process is suitable for application of the thin coating.

In an advantageous development, the reamer is of slotted design, to enable a coolant to be introduced from the guide end, in the longitudinal direction of the tool. Advantageously, the guide end of the reamer has one slot or multiple slots, in particular two slots, with a slotting angular pitch of 90° in each case.

In a further development, a two-stage fine machining method is suitable for significantly reducing the main machining times. In the case of this method, a reamer as described herein is used for roughing. The machining time for the roughing operation is only 5 seconds. The roughing operation is then followed by a concluding finish-machining by means of a finishing tool that is already known per se. Even if the finishing process also takes some seconds, the main machining time is significantly less than 3 minutes.

The cutting speed Vc of the reamer according to the invention is 60 m/min in the case of a feed f of 0.6 mm/revolution and a feed rate Vf of 950 mm/min, such that, for a production operation by means of the reamer, the machining time is approximately 4 seconds.

For machining, finally, there is proposed a tool set comprising two reamers, the one tool being a reamer produced as described herein, which is used for roughing, while a conventional finishing reamer is used as a second tool.

BRIEF DESCRIPTION OF THE DRAWINGS

There follows an exemplary embodiment of the invention. In the figures:

FIG. 4 shows a core section of the reamer represented in FIG. 1.

DETAILED DESCRIPTION OF THE INVENTION

Figure 1:
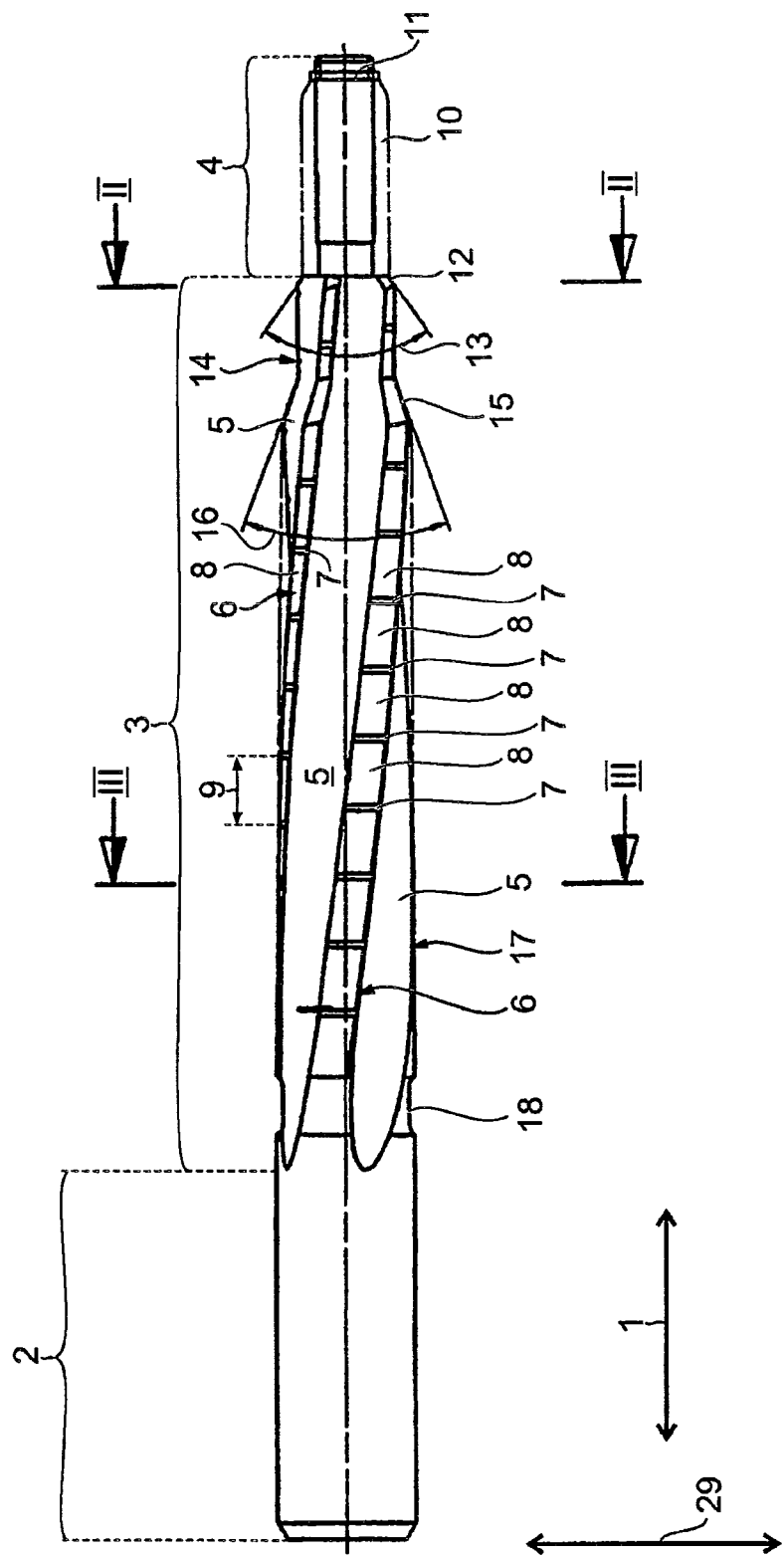
FIG. 1 shows the side view of a reamer according to the invention.

The reamer represented in side view in FIG. 1 divides substantially, viewed in the longitudinal direction 1 of the tool, into a clamping region 2, a cutting-edge region 3 and a guide end 4. The clamping region 2 is a substantially cylindrical shank, by means of which the reamer can be clamped into a tool chuck.

The cutting-edge region 3 consists of chip grooves 5, which are helical in the exemplary embodiment, and of cutting strips 6, which protrude between the chip grooves. The cutting strips 6 constitute a rotationally symmetrical, namely, cylindrical enveloping surface of the basic body of the reamer described.

Chip divider grooves 7 extending in the transverse direction 29 of the tool are formed into the cutting strips 6, transversely relative to the longitudinal direction 1 of the tool. Two mutually adjacent chip divider grooves 7 constitute between them a cutting-edge segment 8 in each case. In the case of the exemplary embodiment, the groove distance 9, measured in the longitudinal direction 1 of the tool, between two chip divider grooves 7 is 6 mm. In the case of the exemplary embodiment, this groove distance 9 between the individual chip divider grooves 7 is constant in each case. In this way, the cutting-edge segments 8 also have the same cutting-edge length in each case. The groove distance 9 between the chip divider grooves 7 is less than 10% of the total length of the cutting-edge region 3. In the case of the exemplary embodiment, this groove distance is 78 mm.

At its guide end 4, the basic body of the reamer carries a rotatably mounted guide sleeve 10. The guide sleeve 10 is held by a circlip 11 at the guide end 4 of the reamer.

Viewed in the longitudinal direction 1 of the tool, from the guide end 4 towards the clamping region 2, the reamer has a first conical enlargement 12 having a first cone angle 13 of 71°. Adjoining the first conical enlargement 12 in the longitudinal direction 1 of the tool, towards the clamping region 2, is the first, thinner basic-body region 14. The first, thinner basic-body region 14 is delimited at its end by a second conical enlargement 15. The first, thinner basic-body region 14 is thus arranged, in the longitudinal direction 1 of the tool, between the first conical enlargement 12 and the second conical enlargement 15. In this first, thinner basic-body region 14, the outer diameter of the reamer is 8.5 mm. The second cone angle 16 of the second conical enlargement 15 is 40°. Adjoining the second cone angle in the longitudinal direction of the tool is the second, thicker basic-body region 17. The second, thicker basic-body region 17 is slightly conical in form, and has a larger outer diameter, between 11.3 and 12.1 mm, from the end of the second conical enlargement towards the clamping region 2 in the longitudinal direction 1 of the tool.

In addition, there is a formed-in groove 18 between the second, thicker basic-body region 17 and the clamping region 2 of the reamer.

Figure 2:
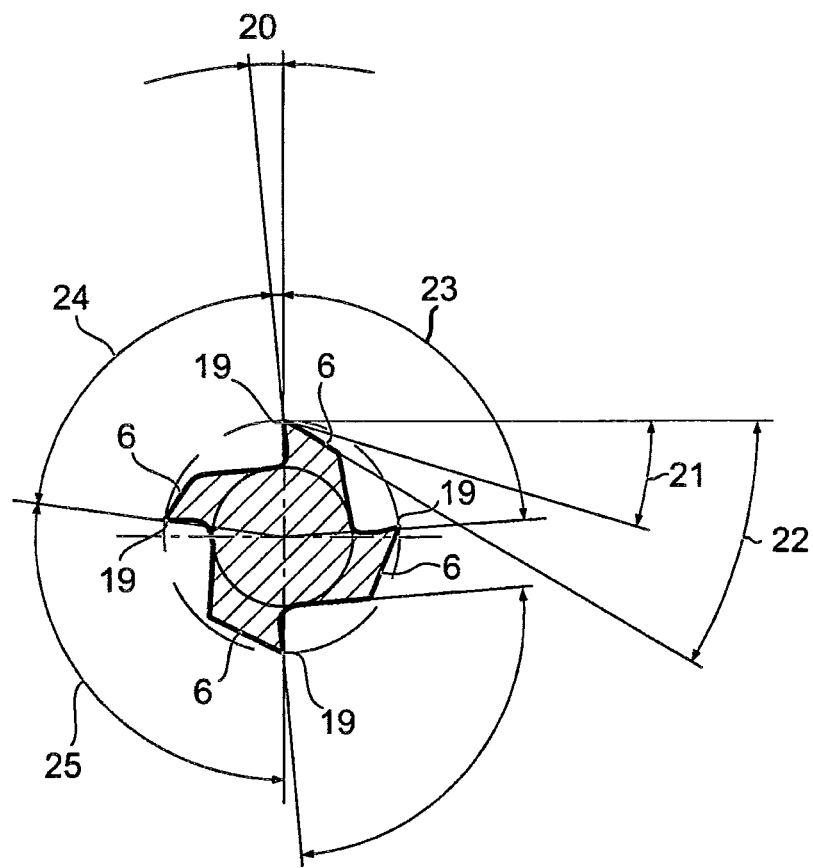
FIG. 2 shows the section II-II from FIG. 1.

FIG. 2 shows the section II-II through the first, thin basic-body region 14. Four cutting strips 6, each having a cutting edge 19, can be seen. A cutting-edge bevel of 0.1 mm adjoins the cutting edge 19 in each case. It is also possible to provide a double cutting-edge bevel on the cutting edge 19. The cutting edges 19 each have a positive rake angle 20 of 4° to 8°. The cutting-edge bevel has a bevel relief angle 21 of 16°. The side face of the cutting strips 6 has a side-face relief angle 22 of 30°.

The cutting edges 6 each have an irregular pitch. The first angular pitch 23 is 86°. The second angular pitch 24 is 83°, and the third angular pitch 25 is 97°.

The irregular pitch, or the differing angular pitches 23, 24, 25, are conducive to the concentricity of the tool and prevent oscillations.

Figure 3:
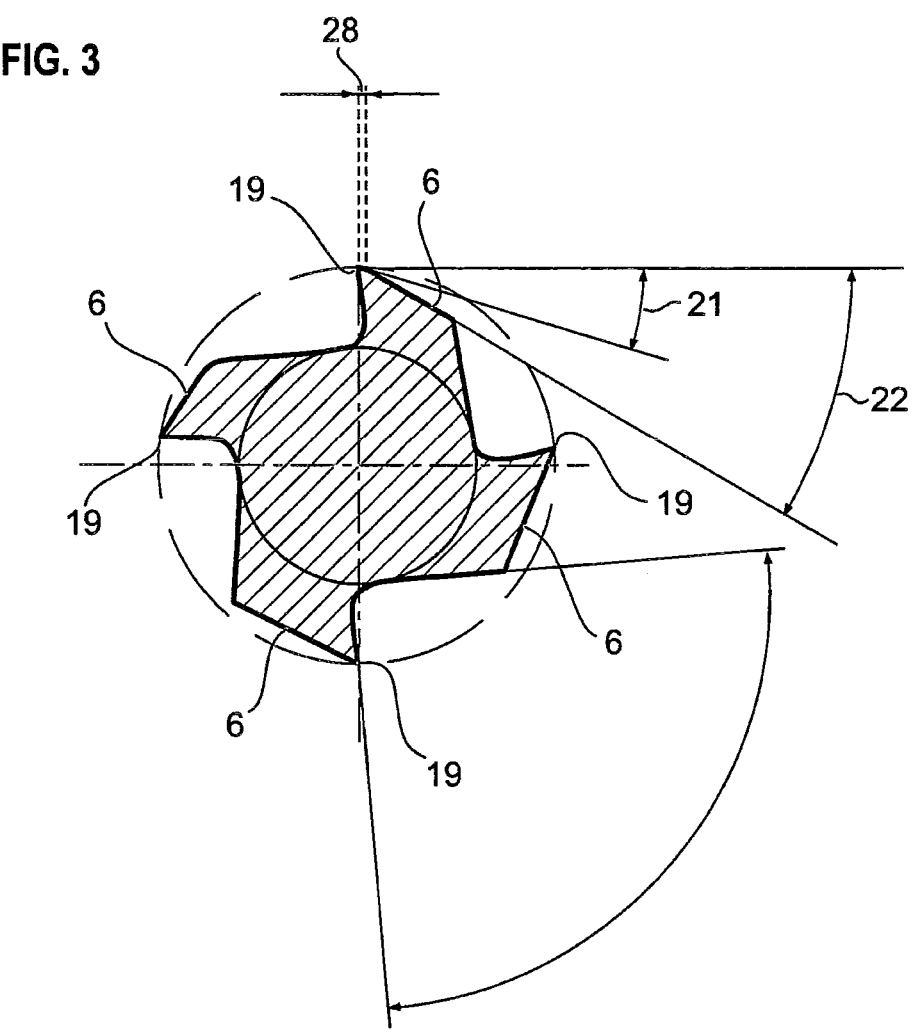
FIG. 3 shows the section from FIG. 1.

In the case of the second, thicker basic-body region 17 shown in a cross-sectional representation in FIG. 3, the bevel relief angle 21 and the side-face relief angle 22, like the first angular pitch 23, the second angular pitch 24 and the third angular pitch 25, are the same as in the case of the first, thinner basic-body region 14 represented in a cross-sectional representation in FIG. 2. In the second, thicker basic-body region 17, the width of the cutting-edge bevel 28 adjoining the cutting edge 19 is 0.2 mm.

It can be seen from the representation in FIG. 4 that a centering bore 26 is made, at each end, in the core of the reamer represented in FIG. 4. FIG. 4 also shows yet again the regions that adjoin one another in the longitudinal direction 1 of the tool, namely, the clamping region 2 and the cutting-edge region 3, and the guide end 4. The guide sleeve 10 represented in FIG. 1 is fitted onto the guide end 4 and fixed by means of the circlip 11. An annular groove 27 is made in the body of the reamer for the purpose of fixing the circlip 11.

It can be seen from the representation in FIG. 1 that the chip divider grooves 7 of two mutually adjacent cutting strips 6 are arranged with an offset in relation to one another in the longitudinal direction 1 of the tool. The entire reamer represented in the exemplary embodiment can be composed of high-speed steel. A solid hard metal, cermet or similar, is equally well suited. The reamer shown in the exemplary embodiment has a thin coating, namely, a DCFD coating having a layer thickness between 0.5 and 0.8 μm. The coating is applied by means of a PVD process.

The invention claimed is:

1. A reamer for the fine machining of a bore, the reamer comprising a plurality of cutting strips, which are separated from one another by chip grooves and extend in the longitudinal direction of the tool, wherein the reamer has a plurality of chip divider grooves, which extend in the transverse direction of the tool and divide the respective cutting strip into cutting-edge segments, wherein the reamer has at least two basic-body regions, of differing outer diameters, that comprises the chip grooves and the cutting strips, the at least two basic-body regions separated by a conical enlargement disposed at a cone angle different from either of the at least two basic-body regions separated thereby, and wherein the reamer has a guide end, which precedes in the longitudinal direction of the tool and wherein the guide has a guide sleeve rotatably mounted on the guide end.

2. The reamer as claimed in claim 1, wherein the reamer has helical chip grooves and helical cutting strips.

3. The reamer as claimed in claim 1, wherein the reamer has an equidistant arrangement of the chip divider grooves on the respective cutting strip.

4. The reamer as claimed in claim 1, wherein the reamer has a cutting-edge bevel succeeding each cutting edge, the cutting-edge bevel width being 0.1 mm in a first, thinner basic-body region of lesser outer diameter and being 0.2 mm in a second, thicker basic-body region of greater outer diameter.

5. The reamer as claimed in claim 1, wherein the reamer has a distance between each of the mutually adjacent chip divider grooves in the longitudinal direction of the tool that is less than 10% of the total length of the cutting-edge region of the reamer basic body that is constituted by the cutting strips.

6. The reamer as claimed in claim 1, wherein the chip divider grooves of the individual cutting strips are offset in relation to one another relative to the longitudinal direction of the tool.

7. The reamer as claimed in claim 1, wherein there are four cutting strips arranged with an unequal pitch in relation to one another.

8. The reamer as claimed in claim 1, wherein the reamer is comprised of solid hard metal as a material.

9. The reamer as claimed in claim 8, further including a thin coating on the solid hard metal.

10. The reamer as claimed in claim 1, wherein the reamer is comprised of ceramic or cubic boron nitride as a material.

11. The reamer as claimed in claim 1, wherein the reamer is comprised of hardened steel as a material.

12. The reamer as claimed in claim 1, wherein the cutting edge has a positive rake angle of 4° to 8°.

13. A fine machining method for a bore drilled into solid material, comprising a roughing operation by means of a reamer having a plurality of cutting strips, which are separated from one another by chip grooves and extend in the longitudinal direction of the tool, wherein the reamer has a plurality of chip divider grooves, which extend in the transverse direction of the tool and divide the respective cutting strip into cutting-edge segments, wherein the reamer has at least two basic-body regions, of differing outer diameters, that comprises the chip grooves and the cutting strips, the at least two basic-body regions separated by a conical enlargement disposed at a cone angle different from either of the at least two basic-body regions separated thereby, and wherein the reamer has a guide end, which precedes in the longitudinal direction of the tool and wherein the guide has a guide sleeve rotatably mounted on the guide end and comprising a concluding finish-machining by means of a finishing tool.

* * * * *